United States Patent
Dietl et al.

(10) Patent No.: US 12,523,543 B2
(45) Date of Patent: Jan. 13, 2026

(54) DEVICE FOR CONTROLLING TRAPPED IONS HAVING A TEMPERATURE SENSOR

(71) Applicant: Infineon Technologies Austria AG, Villach (AT)

(72) Inventors: Matthias German Dietl, Villach (AT); Silke Katharina Auchter, Villach (AT); Sebastian Ludwig Habicht, Villach (AT); Lina Purwin, Villach (AT); Clemens Rössler, Villach (AT); Michael Sieberer, Graz (AT); Alexander Zesar, Villach (AT)

(73) Assignee: Infineon Technologies Austria AG, Villach (AT)

( * ) Notice: Subject to any disclaimer, the term of this patent is extended or adjusted under 35 U.S.C. 154(b) by 510 days.

(21) Appl. No.: 18/071,037

(22) Filed: Nov. 29, 2022

(65) Prior Publication Data

US 2023/0273074 A1 Aug. 31, 2023

(30) Foreign Application Priority Data

Dec. 10, 2021 (DE) .......... 102021132701.6

(51) Int. Cl.
*G01K 7/18* (2006.01)
*H01J 49/42* (2006.01)

(52) U.S. Cl.
CPC .............. *G01K 7/18* (2013.01); *H01J 49/422* (2013.01); *H01J 49/4255* (2013.01)

(58) Field of Classification Search
CPC ....... G01K 7/18; G01K 13/006; H01J 49/422; H01J 49/4255; G06N 10/40; B82Y 10/00
See application file for complete search history.

(56) References Cited

U.S. PATENT DOCUMENTS

| | | | |
|---|---|---|---|
| 11,056,332 B1 | 7/2021 | Maunz et al. | |
| 2012/0292505 A1 | 11/2012 | Damiano et al. | |
| 2018/0323051 A1 | 11/2018 | Polfer et al. | |
| 2020/0111657 A1 | 4/2020 | Mccauley et al. | |
| 2021/0285718 A1* | 9/2021 | Nakagawasai | F25D 29/005 |

OTHER PUBLICATIONS

"DT-670 Silicon Diodes", Lake Shore Cryotronics—Advancing Science.
Holz, P.C., et al., "Electric field noise in a high-temperature superconducting surface ion trap", Aug. 27, 2021, pp. 1-15.
Lakhmanskiy, K., et al., "Observation of superconductivity and surface noise using a single trapped ion as a field probe", American Physical Society, Phys. Rev. A 99, Feb. 4, 2019, pp. 1-8.
Revelle, Melissa, "Phoenix and Peregrine Ion Traps Version 1", Sandia National Laboratories, https://doi.org/10.48550/arXiv.2009.02398, Sep. 8, 2020, pp. 1-50.

* cited by examiner

*Primary Examiner* — Peter J Macchiarolo
*Assistant Examiner* — Mireille S Sadate-Moualeu
(74) *Attorney, Agent, or Firm* — Murphy, Bilak & Homiller, PLLC

(57) ABSTRACT

A device for controlling trapped ions includes a substrate. An electrode structure is mounted on the substrate. The electrode structure includes DC electrodes and RF electrodes of an ion trap configured to trap ions in a space above the substrate. A temperature sensor is disposed at the substrate and configured to sense temperatures below 50K.

16 Claims, 4 Drawing Sheets

DEVICE FOR CONTROLLING TRAPPED IONS HAVING A TEMPERATURE SENSOR

TECHNICAL FIELD

This disclosure relates generally to the field of ion traps, and in particular to ion traps for quantum computing installed in a cryogenic environment.

BACKGROUND

Trapped ions are one of the most promising candidates for use as qubits (quantum bits) in quantum computers since they can be trapped with long lifetimes in a scalable array by virtue of electromagnetic fields. Presently, the most advanced ion traps can control about 50 qubits individually and can maintain up to 16 qubits in a fully entangled state. Future quantum computers will need to increase the number of controllable qubits to more than 100 or even 1000 to outperform classical supercomputers. Further, the number of ions used for each qubit will in future be raised to about 6 to 100 ions in order to allow for more efficient error-correction during quantum computing.

To minimize the interference on the ions, the ion trap device is operated in a cryostat at low temperatures in an ultra-high vacuum. To operate the ion trap effectively, monitoring and control of the physical properties (temperature, pressure, etc.) of the environment is particularly important. In view of the upscaling towards higher ion or qubit numbers, the importance of precise temperature measurement at critical locations increases. Temperature monitoring is complicated by waste heat generated by RF losses and laser absorption at the trap.

SUMMARY

According to an aspect of the disclosure, a device for controlling trapped ions includes a substrate. An electrode structure is mounted on the substrate. The electrode structure comprises DC electrodes and RF electrodes of an ion trap configured to trap ions in a space above the substrate. A temperature sensor is disposed at the substrate for sensing temperatures below 50K.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other and/or can be selectively omitted if not described to be necessarily required. Embodiments are depicted in the drawings and are exemplarily detailed in the description which follows.

DETAILED DESCRIPTION

The words "over" or "on" or "beneath" with regard to a part, element or material layer formed or located or disposed or arranged or placed "over" or "on" or "beneath" a surface may be used herein to mean that the part, element or material layer be located (e.g. placed, formed, arranged, disposed, placed, etc.) "directly on" or "directly under", e.g. in direct contact with, the implied surface. The word "over" or "on" or "beneath" used with regard to a part, element or material layer formed or located or disposed or arranged or placed "over" or "on" or "beneath" a surface may, however, either be used herein to mean that the part, element or material layer be located (e.g. placed, formed, arranged, deposited, etc.) "indirectly on" or "indirectly under" the implied surface, with one or more additional parts, elements or layers being arranged between the implied surface and the part, element or material layer.

Further, the words "over" or "on" or "beneath" do not imply a specific spatial orientation of the element "over" or "on" or "beneath" a part or a material layer is formed or located or disposed. That is, e.g. in the vertical Z-dimension, the words "over" or "on" or "beneath" may be used both for the +Z-direction or the −Z-direction relative to said element depending on its orientation in space.

Figure 1:
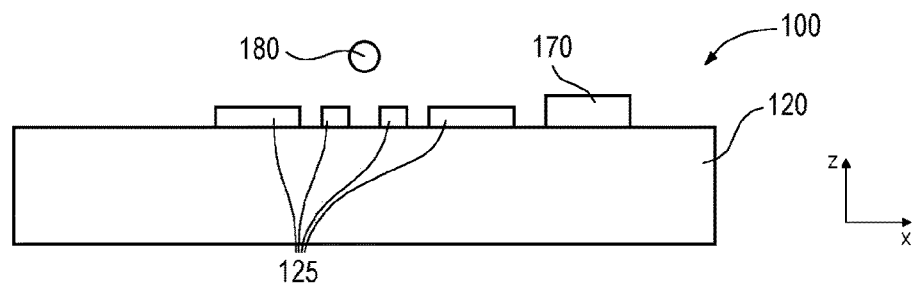
FIG. 1 is a schematic cross-sectional view of an exemplary device for controlling trapped ions having a substrate on which a temperature sensor is disposed.

Referring to FIG. 1, a device 100 for controlling trapped ions may include a substrate 120 and a structured first metal layer 125 disposed over the substrate 120. The structured first metal layer 125 forms electrodes of an ion trap configured to trap one or a plurality of ions 180 in a space above the structured first metal layer 125 (only one ion 180 is illustrated in FIG. 1 for ease of illustration).

The substrate 120 may, e.g., comprise or be of a semiconductor material, e.g. silicon or silicon carbide or silicon-on-insulator (SOI). In other examples, the substrate 120 may comprise or be of a dielectric material such as, e.g., glass, fused silica or sapphire.

The substrate 120 may be a chip diced out of a wafer. In other examples, the substrate may be a wafer. In some examples, the structured first metal layer 125 and thus the electrodes of the ion trap(s) are fabricated by micro-fabrication techniques.

The location of the ions 180 can be controlled by the one or more ion traps by virtue of electrical voltages applied to the structured first metal layer 125. For instance, the ions 180 can be moved in the space in one or more lateral directions by virtue of RF and DC voltages separately coupled to RF and DC electrodes formed out of the structured first metal layer 125. Lateral directions are the X-direction and the Y-direction (see e.g. FIG. 2) and any direction lying in a plane which is normal to the Z-direction.

The substrate 120 may be substantially planar. The Z-direction may represent the height dimension of the device 100. The X-direction and the Y-direction are perpendicular to each other and define a plane in the width and length direction of the device 100, which is normal to the Z-direction.

For example, in FIG. 1 the ion trap of the device 100 is designed as a so-called "surface-electrode" ion trap. In surface-electrode ion traps all electrodes (i.e. DC electrodes and RF electrodes) are contained in a single plane. Such two-dimensional ion trap geometries provide for high scalability. As will be described further below, in other examples the device 100 for controlling trapped ions may use three-dimensional ion trap geometry, see e.g. FIG. 5.

In the examples disclosed herein the structured first metal layer 125 may include RF electrodes for RF trapping and DC electrodes for static electric-field trapping. An ion trap disclosed herein can trap many ions 180 that may be individually addressable and movable by appropriately controlling the potentials of the electrodes of the ion trap(s).

A temperature sensor 170 is disposed at the substrate 120. For example, the temperature sensor 170 may be mounted on the substrate 120 or may be embedded in the substrate 120. Installation of the temperature sensor 170 to the substrate 120 should ensure close thermal contact (i.e. low thermal resistance) between the substrate 120 and the temperature sensor 170. For example, the temperature sensor 170 may be an on-substrate integrated temperature sensor. In some examples, the temperature sensor 170 is fabricated in or over the substrate 120 by micro-fabrication techniques including, e.g., layer deposition, lithography, structuring, etc.

The temperature sensor 170 is configured to detect temperatures below 50K or 30K. In particular, the temperature sensor 170 may be configured to operate in a range between 5K and 30K, more specifically between 10K and 20K. In these temperature ranges, the temperature has a large impact on ion trap characteristics and performance, and therefore accurate detection of the actual temperature of the ion trap in these temperature ranges is important.

Figure 2:
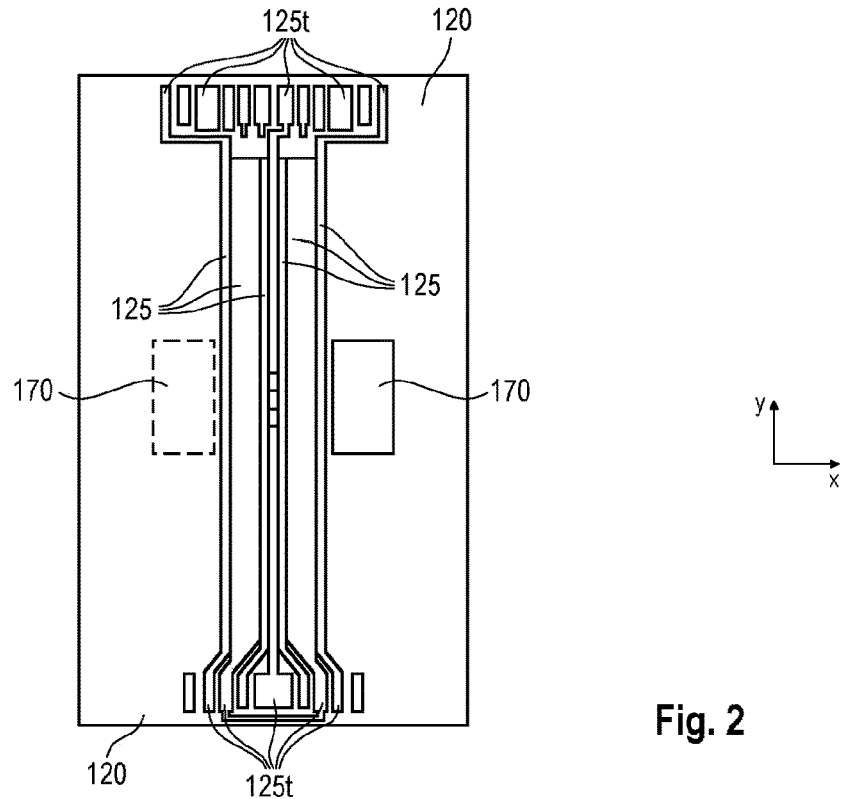
FIG. 2 is a top view of a substrate of an exemplary device for controlling trapped ions having a similar construction as the device shown in FIG. 1.

FIG. 2 is a schematic top view of a simplified electrode structure formed in the structured first metal layer 125. A single metal layer 125 electrode structure (see e.g. FIG. 1) or a multilayer electrode structure (see e.g. FIGS. 4, 5, 7A-7B, 8) may be used. Some of the electrodes are formed as stripe electrodes, while other electrodes may be formed as insular electrodes of small lateral dimensions. Many different electrode layouts are known in the art and could be used in the examples disclosed herein. Further, the electrode layout provided by the structured first metal layer 125 may comprise Y-junctions and/or X-junctions (not shown) for ion shuttling in different lateral directions.

As shown in FIG. 2, the temperature sensor 170 may be located adjacent a central part of the electrode structure. Further, a plurality of temperature sensors 170 (e.g. an additional temperature sensor 170 indicated by a dashed line located opposite the central part of the electrode structure) may be provided.

FIG. 2 illustrates terminal lands 125t of the structured first metal layer 125 available for electrically connecting the micro-fabricated electrode structure 125 including its RF and DC electrodes via connectors (not shown, e.g. wire bonds) to external circuitry (not shown). Other designs of terminals of the ion trap (i.e. terminals at the substrate 120) are also feasible. The electrodes may, in other examples, not be connected to terminal lands 125t exposed at the substrate 120 but, e.g., to vias which directly connect to integrated circuitry (not shown) in the substrate 120 or to electrical conductors on a PCB (printed circuit board—not shown) on which the substrate 120 is mounted. Such PCB may serve to carry the substrate 120 and, optionally, external circuitry for controlling the ion trap.

Figure 3:
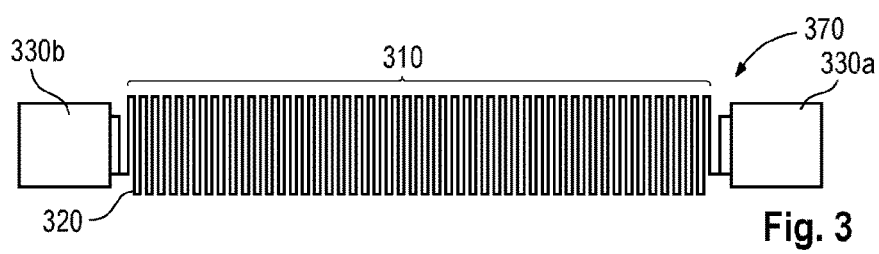
FIG. 3 is a top view of a temperature sensor formed of a tortuous metal line shaped as a meander structure.

The temperature sensor 170 may comprise a sensor area formed of a tortuous (or convoluted, wound, wrapped, elongated) metal line. FIG. 3 illustrates an example of a temperature sensor 370 having a sensor area 310 formed of a tortuous metal line 320. The tortuous metal line 320 may lie in a plane parallel to the surface of the substrate. The tortuous metal line 320 may be formed by micro-fabrication techniques.

The tortuous metal line 320 is, in this example, shaped as a meander structure. The tortuous metal line 320 may be shaped in other structures such as, e.g., a winding or coil structure (not shown). Generally, the tortuous metal line 320 may be shaped in various densely-packed continuous line patterns. The line pattern may have a regular structure (e.g. meander) defined by a characteristic line pitch (e.g. meander line pitch).

The sensor area 310 is defined by the footprint of the line pattern of the tortuous (e.g. wound) metal line 320. The longer the metal line 320 and the smaller the width of the metal line 320, the higher is the resistance of the metal line 320 and therefore the sensitivity of the temperature sensor 370.

As illustrated in FIG. 3, the ends of the tortuous metal line 320 are each connected to a pad 330a, 330b. The pads 330a, 330b allow to electrically contact the ends of the tortuous metal line 320 for purpose of measurement.

In one example, the electrode structure of the ion trap forms a part of the first metal layer 125 (e.g. FIGS. 1 and 2), and at least a part of the tortuous metal line 320 is structured out of the first metal layer 125. In this example, the temperature sensor 170 shown in FIGS. 1 and 2 may comprise or be formed of a tortuous metal line 310 (e.g. FIG. 3) which is made of the same first metal layer 125 as the ion trap electrodes. In this example, the temperature sensor 170 shown in FIG. 2 may correspond to the sensor area 310 of FIG. 3.

In general, unused areas of the first metal layer 125 may be structured into a sensor area 310 and used as temperature sensor(s) 170, 370. No additional lithography steps need to be implemented for forming such micro-fabricated on-substrate temperature sensors 170.

Figure 4:
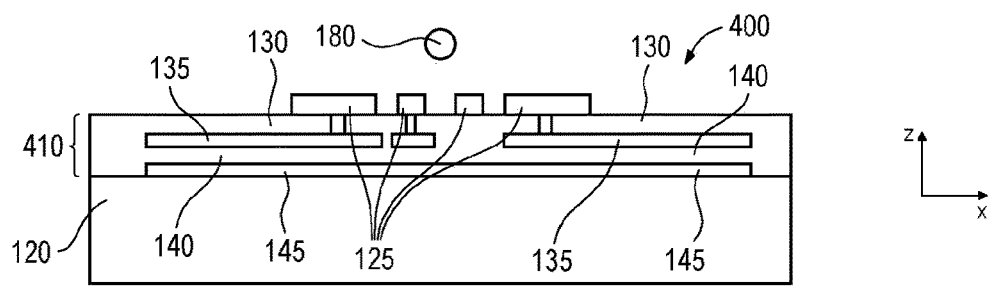
FIG. 4 is a schematic cross-sectional view of an exemplary device for controlling trapped ions having a multilayer micro-fabricated electrode structure and a temperature sensor disposed at the substrate.

The temperature sensor 170, 370 may also be implemented in multi-layer ion trap technology. FIG. 4 illustrates an exemplary device 400 for controlling trapped ions having a multi-layer micro-fabricated electrode structure. For instance, compared to device 100, the device 400 may further comprise a structured second metal layer 135 disposed over the substrate 120 and a dielectric layer 130 disposed over the structured second metal layer 135 and disposed beneath the structured first metal layer 125. Further, the device 400 may, optionally, include more metal layers, e.g. a (structured or non-structured) third metal layer 145 disposed over the substrate 120 and separated from the structured second metal layer 135 by a dielectric layer 140 disposed over the third metal layer 145 and beneath the structured second metal layer 135.

The dielectric layers 130, 140 may, e.g., comprise or be of an inorganic hard passivation material such as, e.g., silicon nitride and/or silicon oxide. They may be formed by microfabrication, e.g. by plasma-CVD (chemical vapor deposition) or, e.g., by thermal decomposition of tetraethyl orthosilicate (TEOS).

In this example, a multi-layer metal structure 410 disposed over the substrate 120 includes the structured first metal layer 125, the structured second metal layer 135 and the third metal layer 145.

In multi-layer ion trap technology, the tortuous metal line 320 may be part of the multi-layer metal structure 410. More specifically, the tortuous metal line 320 may be structured out of at least two metal layers 125, 135, 145 of the multi-layer metal structure 410. For example, a part of the tortuous metal line 320 may be structured out of the second metal layer 135 of the multi-layer metal structure 410. For example, another part of the tortuous metal line 320 may be structured out of the third metal layer 145 of the multi-layer structure 410.

In this example, the first metal layer 125, which provides for the electrode structure of the ion trap, may not contribute to the tortuous metal line 320. The tortuous metal line 320 may either be formed exclusively in the structured second metal layer 135 or exclusively in the structured third metal layer 145 or both in the structured second metal layer 135 and the structured third metal layer 145. Generally speaking, the tortuous metal line 320 may be structured out of one or a plurality of metal layers of the multi-layer structure 410 while, optionally, not being part of the exposed first metal layer 125.

When the first metal layer 125 does not contribute to the tortuous metal line 320, it may be formed over the sensor area 310 as a continuous shielding layer that completely covers the tortuous metal line 320 in a vertical projection.

On the other hand, the third metal layer 145 may be structured as a continuous shielding layer within the area of the electrode structure of the ion trap. Within the sensor area 310, the third metal layer 145 may either contribute to the tortuous metal line 320 (as mentioned above) or may continue as a continuous shielding layer (if the tortuous metal line 320 is structured out of one or both of the second metal layer 135 and the first metal layer 125).

The single metal layer 125 (FIG. 1) or the multi-layer metal structure 410 (FIG. 4), that may include the temperature sensor 170, 370 (in particular, the tortuous metal line 320), may be formed by micro-fabrication techniques. Generally, micro-fabrication techniques may, e.g., involve photolithography methods (e.g. including photoresist application, patterning, etching) and/or deposition techniques (e.g. chemical vapor deposition (CVD), physical vapor deposition (PVD), sputtering) and/or plating techniques (e.g. electroless plating, galvanic plating) for applying dielectric layers 130, 140 and metal layers 125, 135, 145. Further, micro-fabrication techniques may include etching processes for structuring photoresist layers, dielectric layers 130, 140 and metal layers 125, 135, 145. Metals such as, e.g., Cu, Al, AlCu, AlSiCu, Au, Pt, Pd, Ti, TiW, TiN and any alloys or combinations of these metals, etc., may be used for metal layers 125, 135, 145.

The structuring of the electrodes in the structured first metal layer 125 and also the structuring of the second and third metal layers 135, 145 may be carried out with micrometer or sub-micrometer scale precision and alignment accuracy. This allows to achieve complex electrode layouts without loss of controllability of the trapped ions 180. This way, it is also possible to design sensor areas 310 that are densely filled by a long and narrow tortuous metal line 320.

In FIGS. 1 and 4 the ion trap of the device 100, 400 is exemplified to be designed as a so-called "surface-electrode" ion trap. In surface-electrode ion traps all electrodes (i.e. DC electrodes and RF electrodes) are contained in a single plane. Such two-dimensional ion trap geometries provide for high scalability. In other examples the device 100, 400 for controlling trapped ions may use three-dimensional ion trap geometry, see e.g. FIG. 5.

Figure 5:
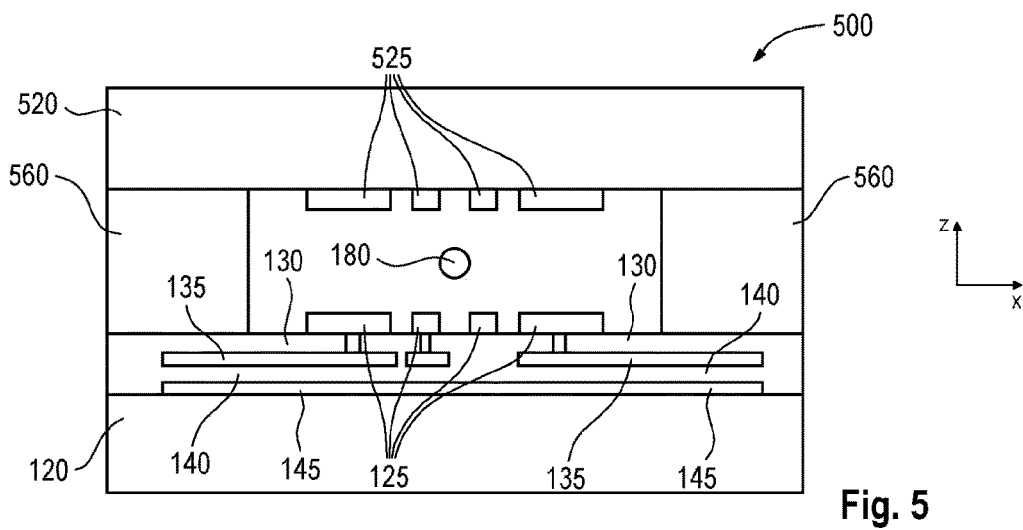
FIG. 5 is a schematic cross-sectional view of an exemplary device for controlling trapped ions having a multilayer micro-fabricated electrode structure and a further substrate disposed over and spaced apart from the substrate shown in FIG. 4.

FIG. 5 illustrates a device 500 for controlling trapped ions which is implemented as a three-dimensional ion trap. Three-dimensional ion trap geometries such as, e.g., linear Paul trap(s) distinguish over the surface-electrode trap geometries (see e.g. FIGS. 1 and 4) by allowing substantially higher potential depths and higher trap frequencies.

Ion traps disclosed herein may be linear traps in which RF trapping is used in two dimensions while static electric-field trapping is used in the third dimension.

In the exemplary device 500 shown in FIG. 5, the ion(s) 180 are trapped between the substrate 120 and a further substrate 520 disposed over and spaced apart from the substrate 120. One or a plurality of spacer members 560 may be disposed between the substrate 120 and the further substrate 560.

The spacer members 560 define the spacing between the substrate 120 and the further substrate 520. The spacer members 560 may be bonded to the substrate 120 and/or to the further substrate 560 by wafer-bonding techniques. For instance, glass-bonding techniques or eutectic bonding techniques or anodic bonding techniques or thermocompression bonding techniques may be applied.

In the example shown in FIG. 5, a structured metal layer 525 is disposed at a main side of the further substrate 520 opposite the structured first metal layer 125. The structured metal layer 525 forms electrodes of the (three-dimensional) ion trap. The ion trap is configured to trap ion(s) 180 in the space between the structured first metal layer 125 and the structured metal layer 525.

Various ion manipulation zones may be implemented in the space above the substrate 120 (and, e.g., below the top substrate 140). Such different ion manipulation zones may implement a number of different functionalities in terms of ion loading, ion handling and ion control.

For instance, ions 180 can be trapped in a processing zone PZ in which quantum operations between trapped ions 180 (then acting as so-called quantum bits (qubits)) may be carried out. If the ions 180 are trapped as qubits, the qubit states need to be controlled and read out. Hence, a processing zone PZ typically requires the access of laser light for laser-based state preparation of trapped ions and laser light for reading out the qubit states (or alternatively the read-out operation may be carried out in a separate readout zone). Further, fluorescence light from ions 180 in the processing zone PZ may need to be collected for state measurement. These light inputs, as well as the operation of the RF electrodes, result in a time-varying heat dissipation within or near the ion trap. To ensure the controllability of the ion trap during operation, it is advantageous to know the actual temperature inside the ion trap accurately (e.g., to an accuracy of 5 or 2 or 1K or less).

In general, the further substrate 520 may be characterized by the same features disclosed above for the substrate 120. Specifically, the further substrate 520 may be provided with a multi-layer metal structure 410. Moreover, the further substrate 520 may be provided with a temperature sensor 170, 370. When the further substrate 520 is provided with the temperature sensor 170, 370, a temperature sensor 170, 370 may or may not be disposed at the substrate 120. In general, all disclosure provided above in connection with the substrate 120 may also apply to the further substrate 520, and reference is made to the above description to avoid reiteration.

Figure 6:
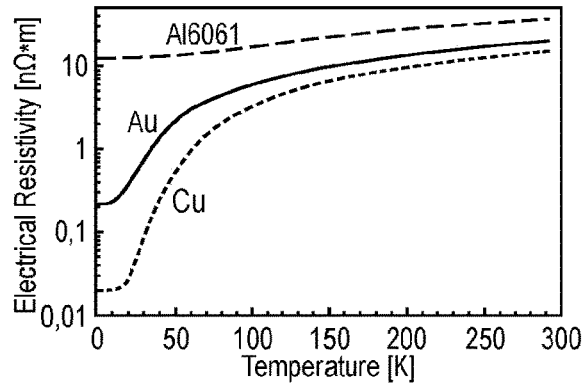
FIG. 6 is a diagram showing the electrical resistivity of metals Cu, Au, Al6061 versus the temperature.

FIG. 6 illustrates the dependency of the electrical resistivity (in $n\Omega \times m$) from temperature for various materials, namely Cu, Au, and AlSiCu alloy 6061 (known as Al6061). As apparent from FIG. 6, the resistivity of Cu and Au is strongly dependent from temperature between about 15K and 50K. This temperature dependency of the resistivity of metals can be used for structuring a temperature sensor 170, 370 out of one or a plurality of metal layers in an ion trap.

More specifically, a long and thin metal line 320 is located at the ion trap, i.e. disposed at a substrate 120, 520 of the ion trap device 100, 400, 500. The metal line 320 may have a length equal or greater than 50 or 70 or 90 cm. Further, the metal line 320 may have a structure width of equal to or less than 5 μm or 2 μm or 1 μm. The metal line 320 is tortuous to fit in a defined sensor area 310 on the substrate 120, 520. As mentioned above, several metal layers may be used to increase the length of the tortuous metal line 320 without increase the sensor area 310.

The temperature measurement may be carried out by applying a defined current to the tortuous metal line 320. The voltage drop across the ends of the tortuous metal line 320 (i.e. between the pads 330*a* and 330*b* of FIG. 3) is measured. The voltage drop depends on the temperature of the metal of the tortuous metal line 320.

A four-point voltage measurement may be carried out both during calibration of the temperature sensor 170, 370 and/or during trap operation. The temperature-voltage curve obtained from the calibration may serve as a reference during ion trap operation. A four-point voltage measurement may be carried out by using two contact elements per pad 330*a*, 330*b*, with one pair of contact elements being used to supply the given measurement current and the other pair of contact elements being used for measurement of the voltage drop. A four-point measurement on the tortuous metal line 320 prevents the voltage measurement from being distorted by the contact resistance between the contact elements and the pads 330*a*, 330*b*.

A higher resistance of the tortuous metal line 320 is associated with a larger voltage change per temperature change. Since larger voltage differences can be measured more accurately than smaller voltage differences, a higher resistance of the tortuous metal line 320 means a more accurate temperature determination.

For this reason, a tortuous metal line 320 that is as long (length L) and thin (cross-sectional area A) as possible is advantageous. The resistivity of the metal is denoted by ρ. The resistance R of the tortuous metal line 320 may be written as $$R = \frac{\rho L}{A} \quad (1)$$

To implement these criteria the tortuous metal line 320 may run in multiple metal layer planes of the ion trap device 400, 500. For instance, the tortuous metal line 320 may have a length L equal to or greater than 50 cm or 70 or 90 cm and/or may occupy an sensor area 310 of equal to or greater than 1 or 2 mm² or equal to or less than 10 or 5 mm². For example, the calculated resistance of a tortuous metal line 320 of Cu with L=90 cm, cross-sectional line area A=1.0× 1.0 μm, sensor area of only 2.75 mm² (formed e.g. by a sensor area of 2.5×1.1 mm) provided in two metal planes (metal layers) at a temperature of 4K is over 25Ω.

Figures 7A, 7B:
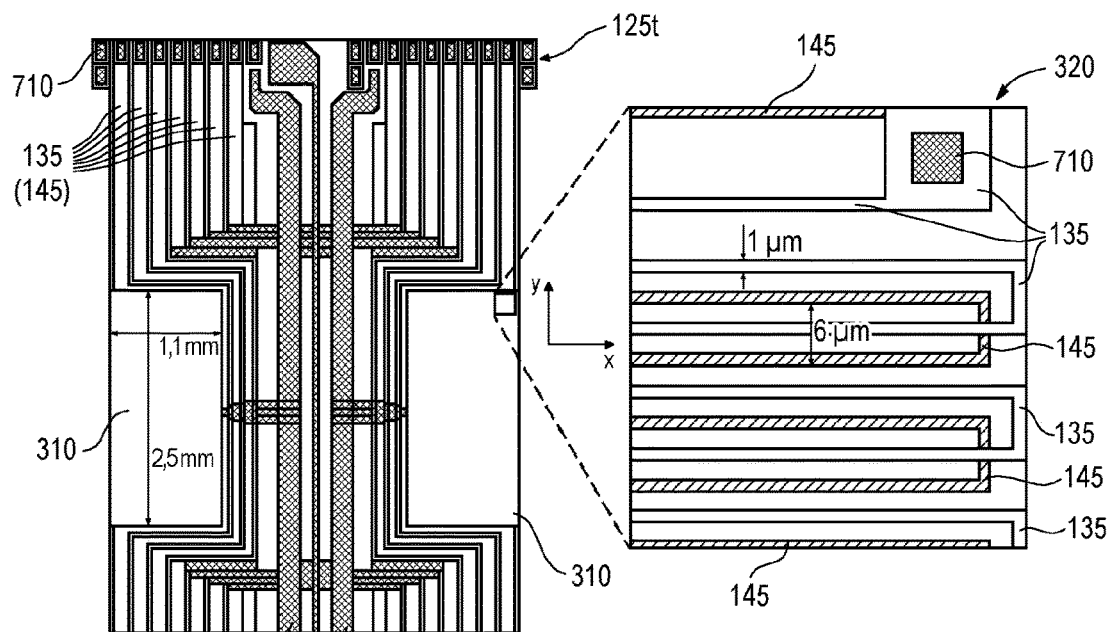
FIG. 7A is a true-to-scale top view of a substrate of an exemplary device for controlling trapped ions.
FIG. 7B is a true-to-scale illustration of a detail of a sensor area of FIG. 7A.

FIGS. 7A and 7B illustrate exemplary layouts of the second and third metal layers 135, 145 of an ion trap device 400, 500 as described above. The layout of the first metal layer 125 (which is not depicted in FIGS. 7A and 7B) may correspond to the electrode layout shown in FIG. 2. Further, FIGS. 7A and 7B illustrate vias 710 that connect the second metal layer 135 to the third metal layer 145.

As apparent from FIG. 7A, the second metal layer 135 and the third metal layer 145 are structured to provide for an interconnect between the terminal lands 125*t* (formed over a row of vias 710) and the RF and DC trap electrodes (which may correspond in shape to the central stripes of vias 710). The structure pattern of the second metal layer 135 and the third metal layer 145 may be similar to each other.

FIG. 7B illustrates a detail of the structured second metal layer 135 and the structured third metal layer 145 within the sensor area 310. The size of the sensor area 310 is, in this example, 2.75 mm². As illustrated in FIG. 7B a part of the tortuous metal line 320 is structured out of the second metal layer 135 and another part of the tortuous metal line 320 is structured out of the third metal layer 145. These parts of the tortuous metal line 320 may be connected by via 710.

The part of the tortuous metal line structured out of the second metal layer 135 and the part of the tortuous metal line structured out of the third metal layer 145 may be arranged offset from each other in vertical projection. For example, FIG. 7B illustrates that the second metal layer meanders and the third metal layer meanders of the tortuous metal line 320 are offset from each other both in the X-direction and in the Y-direction. In this example the width of the tortuous metal line 320 is 1 μm. The distance between adjacent line sections of a meander measured in the Y-direction (i.e. the meander pitch) may be 6 μm. The offset may, e.g., be half of the meander pitch.

The meander pitch or, more generally, the pattern pitch of the tortuous metal line 320 is a measure of the packing density of the line pattern. The pattern pitch may be equal to or less than e.g. 10 μm or 8 μm or 6 μm.

The offset reduces the risk of short circuits between the part of the tortuous metal line 320 structured out of the second metal layer 135 and the part of the tortuous line 320 structured out of the third metal layer 145. This can render the manufacturing process more robust to misalignment or other imperfections, such as insufficient insulation between adjacent metal layers 135, 145. In other words, the size of intersecting areas of the part of the tortuous metal line 320 structured out of the second metal layer 135 and the part of the tortuous line 320 structured out of the third metal layer 145, is minimized.

The (uppermost) first metal layer 125 (not shown) may serve as a shielding layer to prevent possible interference of the trapped ions by the temperature sensor 170, 370. To this end, the first metal layer 125 may be continuous (i.e. unstructured) across the entire sensor area 310. On the other hand, this shielding may allow the temperature sensor 170, 370 to be placed as close as possible to the electrodes of the ion trap, i.e., to the location where the temperature is to be determined.

In other words, the electrodes of the ion trap and the shielding layer of the temperature sensor 170, 370 may both be structured out of the first metal layer 125 and may be electrically disconnected from each other.

Figure 8:
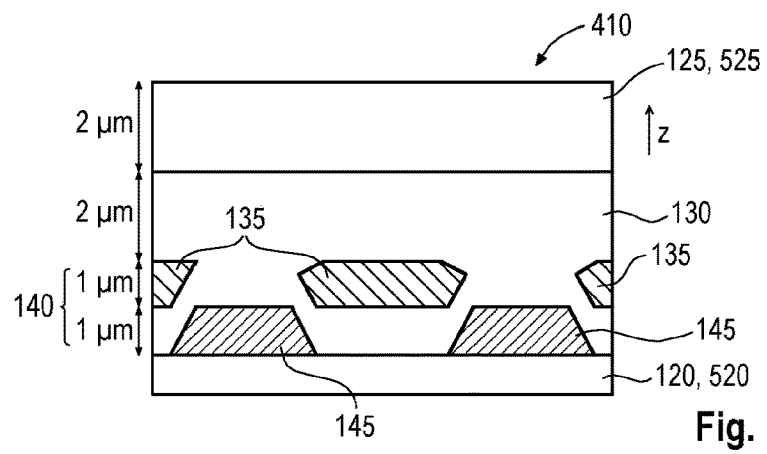
FIG. 8 is a partial sectional view of a multi-layer metal structure in the sensor area.

FIG. 8 illustrates a partial sectional view of the multi-layer metal structure 410 in an exemplary sensor area 310. For example, the thickness of the first metal layer 125, 525 is larger than the thickness of the second metal layer 135 and/or the thickness of the third metal layer 145. In the example shown, the thickness of the first metal layer 125, 525 is 2 µm, while the thickness of the second metal layer 135 and the thickness of the third metal layer 145 are 1 µm.

Further, FIG. 8 illustrates that the second metal layer 135 and the third metal layer 145 may be offset from each other in the X- and/or Y-direction rather than being spaced apart from each other in the Z-direction. In this case, the dielectric layer 140 may have about the same thickness (here: e.g. 2 µm) as the second structured metal layer 135 and the third structured metal layer 145 in total. It is to be noted that at intersections of the tortuous metal line 320 in Z-projection, the second metal layer 135 may use the larger (e.g. 2 µm) thickness of the dielectric layer 130 to bridge the underlying portion of the tortuous metal line 320 in the third metal layer 145. That way a multi-layer metal structure 410 of small total thickness (here: e.g. 4 µm) may be generated.

A temperature sensor 170, 370 as disclosed herein can detect the actual temperature inside the ion trap to an accuracy of equal to or less than 5 or 2 or 1K. The temperature sensor 370 of FIGS. 7A, 7B and 8 (using two metal layers, L=90 cm, A=1.0×1.0 µm, having a sensor area of 2.75 mm² and a meander pitch of 6 µm) reaches an accuracy of about 1K in a temperature range between about 10 and 50K.

Dimensions shown in FIGS. 7A, 7B and 8 are disclosed as exemplary dimensions and/or as exemplary upper and/or exemplary lower limits of ranges of the illustrated dimensions.

Figure 9:
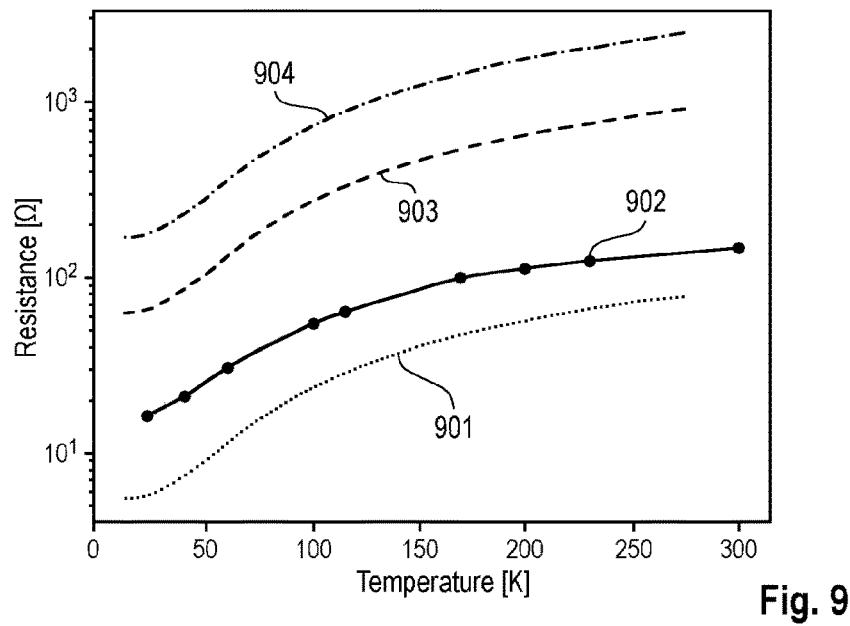
FIG. 9 is a diagram showing the electrical resistance versus temperature of a Cu test-structure and an AlSiCu test-structure of FIG. 3 for a meander pitch of 24 µm and calculated resistance values for Cu meander structures of meander pitches of 6 and 8 µm, respectively.

FIG. 9 illustrates the electrical resistance in Ω versus temperature of tortuous metal line test-structures as shown in FIG. 3. Curve 901 relates to measured resistance values of a Cu tortuous metal line test-structure having a meander pitch of 24 µm. Curve 902 relates to measured resistance values of a test-structure of the same design (i.e. the same L, A, and meander pitch), but made of AlSiCu. Curves 903 and 904 relate to extrapolated resistance values of the same test-structure but for a more densely-packed meander design having a 8 µm meander pitch (curve 903) and a 6 µm meander pitch (curve 904).

FIG. 9 illustrates that the temperature dependency of the electrical resistance depends on the material. The electrical resistance also depends on the meander pitch the tortuous metal line 320. In general, a change in resistance per Kelvin of the tortuous metal line 320 can be achieved that may be equal to or greater than 0.1 or 0.25 or 0.5 Ω/K in a temperature range between about 10 and 50K.

Figure 10:
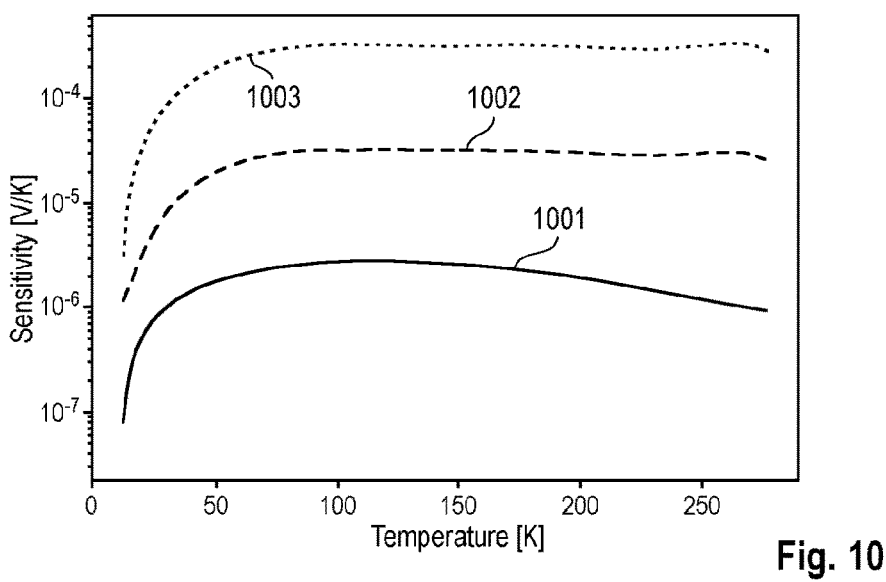
FIG. 10 is a diagram showing the sensitivity versus temperature depending on the current forced through the tortuous metal line of the Cu test-structure of FIG. 3 for a meander pitch of 24 µm.

FIG. 10 illustrates the sensitivity (in V/K) of the tortuous metal line test-structures of FIG. 3 (having a pitch of 24 µm). The sensitivity depends on the current I which is forced through the tortuous metal line 320. As apparent from FIG. 10, the sensitivity increases from low temperatures near 0K in the direction of raising temperatures at about 50 K. The higher the current I, the more sensitive is the tortuous metal line test-structure and thus a temperature sensor 170, 370 formed in accordance with such tortuous metal line test-structure. Curves 1001, 1002, and 1003 have been obtained by using a measurement current of 10 µA, 100 µA, and 1000 µA, respectively. It can be derived from FIG. 10 that a low current of e.g. 10 µA or less may be sufficient to obtain a measurement accuracy of equal to or less than 1K in a temperature range between 1 and 50K for a temperature sensor 170, 370 as e.g. illustrated in FIGS. 7A, 7B, 8.

The temperature sensor 170, 370 may also be used as a heater if higher currents are forced through the tortuous metal line 320. For example, if a plurality of temperature sensors 170, 370 is implemented in the ion trap device 100, 400, 500 (see e.g. FIGS. 2, 7A), one temperature sensor 170, 370 may be used as a heater while another temperature sensor 170, 370 can be used to measure the change in temperature.

Figure 11:
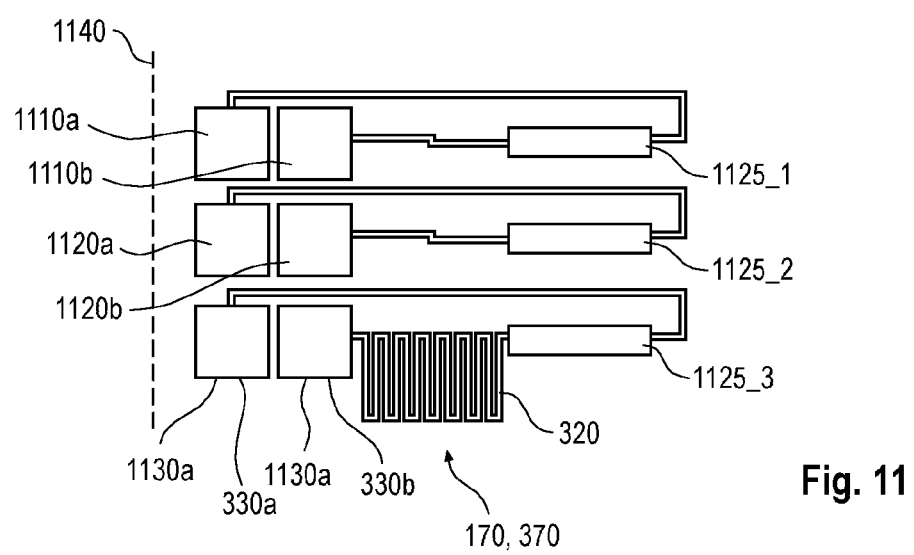
FIG. 11 is a schematic top view of an exemplary electrical interconnect between electrodes of the ion trap and device terminals, wherein the electrical interconnect includes a tortuous metal line of a temperature sensor.

In other examples, the tortuous metal line 320 may form part of a ring line connected to a DC electrode of the ion trap. Ring lines are sometimes used for connecting electrodes and electrode terminals in order to increase the testability of the electrical interconnect of the ion trap. Referring to FIG. 11, for example three DC electrodes 1125_1, 1125_2, 1125_3 are illustrated. The DC electrode 1125_3 is connected to the tortuous metal line 320 of the temperature sensor 170, 370. DC electrode terminals 1130a, 1130b of the DC electrode 1125_3 may then simultaneously form the pads 330a, 330b for the temperature measurement. In other words, the pads 330a, 330b for temperature measurement can be saved, since the DC electrode terminals 1130a, 1130b that are present anyway can be used for temperature measurement. In general, one or more temperature sensors 170, 370 may be implemented as a part of the electrode-to-terminal interconnect of the ion trap.

Reference sign 1140 may indicate the peripheral contour of the substrate 120, 520. The terminal pads 1130a, 1130b for the DC electrode 1125_3 and the temperature measurement as well as terminal pads 1110a, 1110b, 1120a, 1120b for the other DC electrodes 1125_1, 1125_2 may be located on the substrate 120, 520 e.g. adjacent to the peripheral contour 1140.

The ring lines connecting the terminal pads 1110a, 1110b, 1120a, 1120b, 1130a, 1130b to the first, second and third DC electrode 1125_1, 1125_2, 1125_3 may, e.g., be structured out of any one or more of the metal layers 125, 135, 145. For example, both the ring lines as well as the tortuous metal line 320 are structured out of the second metal layer 135 and the third metal layer 145 as, e.g., depicted in FIGS. 7A, 7B and 8 in connection with the tortuous metal line 320.

The following examples pertain to further aspects of the disclosure:

Example 1 is a device for controlling trapped ions. The device includes a substrate; an electrode structure mounted on the substrate, the electrode structure comprising DC electrodes and RF electrodes of an ion trap configured to trap ions in a space above the substrate; and a temperature sensor disposed at the substrate for sensing temperatures below 50K.

In Example 2, the subject matter of Example 1 can optionally include wherein the temperature sensor comprises a sensor area formed of a tortuous metal line.

In Example 3, the subject matter of Example 2 can optionally include wherein the sensor area is located adjacent a central part of the electrode structure.

In Example 4, the subject matter of Example 2 or 3 can optionally include wherein the electrode structure forms a part of a first metal layer disposed over the substrate, and at least a part of the tortuous metal line is structured out of the first metal layer.

In Example 5, the subject matter of any of Examples 2 to 4 can optionally include wherein a multi-layer metal structure is formed over the substrate, and the tortuous metal line is structured out of at least two metal layers of the multi-layer metal structure.

In Example 6, the subject matter of Example 5 can optionally include wherein the electrode structure forms a part of a first metal layer of the multi-layer metal structure, and at least a part of the tortuous metal line is structured out of a second metal layer of the multi-layer metal structure.

In Example 7, the subject matter of Example 5 can optionally include wherein the electrode structure forms a part of a first metal layer of the multi-layer metal structure, and the tortuous metal line is structured out of at least a second metal layer and a third metal layer of the multi-layer metal structure.

In Example 8, the subject matter of Example 7 can optionally include wherein the part of the tortuous metal line structured out of the second metal layer and the part of the tortuous metal line structured out of the third metal layer are arranged offset from each other in a vertical projection.

In Example 9, the subject matter of Example 7 or 8 can optionally include wherein the part of the tortuous metal line structured out of the second metal layer and the part of the tortuous metal line structured out of the third metal layer comprise metal lines sections that intersect in a vertical projection.

In Example 10, the subject matter of any of Examples 2 to 9 can optionally include wherein the tortuous metal line is shaped to comprise a meander structure or a winding structure.

In Example 11, the subject matter of any of Examples 2 to 10 can optionally include wherein the tortuous metal line has a length of equal to or greater than 50 or 70 or 90 cm.

In Example 12, the subject matter of any of Examples 2 to 11 can optionally include wherein the tortuous metal line has a structure width of equal to or less than 2 µm or 1 µm.

In Example 13, the subject matter of any of Examples 2 to 12 can optionally include wherein a change in resistance per Kelvin of the tortuous metal line is equal to or greater than 0.1 or 0.25 or 0.5 Ω/K.

In Example 14, the subject matter of any of Examples 2 to 13 can optionally include wherein the sensor area is equal to or greater than 1 or 2 mm².

In Example 15, the subject matter of any of Examples 2 to 14 can optionally include wherein the tortuous metal line forms part of a ring line connected to a DC electrode.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A device for controlling trapped ions, the device comprising:
    a substrate;
    an electrode structure mounted on the substrate, the electrode structure comprising DC electrodes and RF electrodes of an ion trap configured to trap ions in a space above the substrate, the electrode structure being formed in a first metal layer; and
    a temperature sensor disposed at the substrate and configured to sense temperatures below 50K, the temperature sensor comprising a tortuous metal line,
    wherein the tortuous metal line is formed in:
        the first metal layer, or
        a second metal layer disposed between the first metal layer and the substrate, or
        both the second metal layer and a third metal layer disposed between the second metal layer and the substrate.

2. The device of claim 1, wherein the tortuous metal line forms a sensor area.

3. The device of claim 2, wherein the sensor area is located adjacent a central part of the electrode structure.

4. The device of claim 2, wherein a multi-layer metal structure is formed over the substrate, and wherein the tortuous metal line is structured out of at least two metal layers of the multi-layer metal structure.

5. The device of claim 4, wherein the electrode structure forms a part of a first metal layer of the multi-layer metal structure, and wherein at least a part of the tortuous metal line is structured out of a second metal layer of the multi-layer metal structure.

6. The device of claim 4, wherein the electrode structure forms a part of a first metal layer of the multi-layer metal structure, and wherein the tortuous metal line is structured out of at least a second metal layer and a third metal layer of the multi-layer metal structure.

7. The device of claim 6, wherein the part of the tortuous metal line structured out of the second metal layer and the part of the tortuous metal line structured out of the third metal layer are arranged offset from each other in a vertical projection.

8. The device of claim 6, wherein the part of the tortuous metal line structured out of the second metal layer and the part of the tortuous metal line structured out of the third metal layer comprise metal lines sections that intersect in a vertical projection.

9. The device of claim 2, wherein the tortuous metal line is shaped to comprise a meander structure or a winding structure.

10. The device of claim 2, wherein the tortuous metal line has a length of equal to or greater than 50 cm or 70 cm or 90 cm.

11. The device of claim 2, wherein the tortuous metal line has a structure width of equal to or less than 2 µm or 1 µm.

12. The device of claim 2, wherein a change in resistance per Kelvin of the tortuous metal line is equal to or greater than 0.1 Ω/K or 0.25 Ω/K or 0.5 Ω/K.

13. The device of claim 2, wherein the sensor area is equal to or greater than 1 mm² or 2 mm².

14. A device for controlling trapped ions, the device comprising:
    a substrate;
    an electrode structure mounted on the substrate, the electrode structure comprising DC electrodes and RF electrodes of an ion trap configured to trap ions in a space above the substrate; and
    a temperature sensor disposed at the substrate and configured to sense temperatures below 50K,
    wherein the temperature sensor comprises a tortuous metal line, wherein the tortuous metal line forms part of a ring line connected to a DC electrode of the ion trap.

15. The device of claim 14, wherein the DC electrode connected to the ring line has a pair of DC electrode terminals that double as temperature sense pads for the temperature sensor.

16. The device of claim 15, wherein the tortuous metal line is connected between the DC electrode connected to the ring line and one of the DC electrode terminals.

\* \* \* \* \*